(12) United States Patent
Fondahl et al.

(10) Patent No.: US 10,996,066 B2
(45) Date of Patent: May 4, 2021

(54) METHOD FOR COORDINATING A MEETING POINT OF A SELF-DRIVING TRANSPORTATION VEHICLE AND OF A USER

(71) Applicant: VOLKSWAGEN AKTIENGESELLSCHAFT, Wolfsburg (DE)

(72) Inventors: Kristin Fondahl, Braunschweig (DE); Steffen Heinrich, Berlin (DE)

(73) Assignee: Volkwagen Aktiengesellschaft, Wolfsburg (DE)

( * ) Notice: Subject to any disclaimer, the term of this patent is extended or adjusted under 35 U.S.C. 154(b) by 116 days.

(21) Appl. No.: 16/308,833

(22) PCT Filed: May 4, 2017

(86) PCT No.: PCT/EP2017/060726
§ 371 (c)(1),
(2) Date: Dec. 11, 2018

(87) PCT Pub. No.: WO2017/215831
PCT Pub. Date: Dec. 21, 2017

(65) Prior Publication Data
US 2019/0257663 A1    Aug. 22, 2019

(30) Foreign Application Priority Data
Jun. 14, 2016    (DE) ............... 10 2016 210 494.2

(51) Int. Cl.
*G01C 21/34*    (2006.01)
*G01C 21/36*    (2006.01)
(Continued)

(52) U.S. Cl.
CPC ....... *G01C 21/3438* (2013.01); *G01C 21/362* (2013.01); *G05D 1/0088* (2013.01);
(Continued)

(58) Field of Classification Search
CPC .................................................. G01C 21/3438
(Continued)

(56) References Cited

U.S. PATENT DOCUMENTS 9,304,009 B2 *  4/2016  Beaurepaire ....... G01C 21/3617
10,331,727 B2 *  6/2019  Naghdy ................. G06T 11/60
(Continued)

FOREIGN PATENT DOCUMENTS

DE    102009052039 A1    7/2010
DE    102010003610 A1    10/2011
(Continued)

OTHER PUBLICATIONS

Search Report for German Patent Application No. 10 2016 210 494.2; dated Jun. 2, 2017.
(Continued)

*Primary Examiner* — Jean Paul Cass
(74) *Attorney, Agent, or Firm* — Barnes & Thornburg LLP

(57) ABSTRACT

A method for coordinating a meeting point of a self-driving transportation vehicle and of a user including entering a desired meeting point by the user by a communication-capable terminal, transmitting the desired meeting point to a central station or to a self-driving transportation vehicle, receiving the desired meeting point by the central station or the self-driving transportation vehicle, checking current environmental data of the meeting point and/or of a route from the current location of the self-driving transportation vehicle to the desired meeting point, assessing the desired meeting point by using the environmental data, confirming the originally desired meeting point or at least one alternative meeting point by the user, receiving the confirmation by the central station or the self-driving transportation vehicle, and implementing an automated journey of the self-driving (Continued)

transportation vehicle to the confirmed meeting point according to the method.

12 Claims, 2 Drawing Sheets

(51) Int. Cl.
G05D 1/00 (2006.01)
G05D 1/02 (2020.01)
G08G 1/00 (2006.01)

(52) U.S. Cl.
CPC .......... *G05D 1/0285* (2013.01); *G08G 1/202* (2013.01); *G05D 2201/0213* (2013.01)

(58) Field of Classification Search
USPC .......................................................... 701/41
See application file for complete search history.

(56) References Cited

U.S. PATENT DOCUMENTS

| | | | |
|---|---|---|---|
| 10,371,539 B2 * | 8/2019 | Broyles | G01C 21/362 |
| 10,408,624 B2 * | 9/2019 | Salowitz | G01C 21/3682 |
| 10,419,878 B1 * | 9/2019 | Sanchez | H04W 4/021 |
| 2013/0046456 A1 * | 2/2013 | Scofield | G01C 21/3453 |
| | | | 701/117 |
| 2015/0219464 A1 * | 8/2015 | Beaurepaire | G01C 21/3438 |
| | | | 701/538 |
| 2016/0364678 A1 * | 12/2016 | Cao | G06Q 50/30 |
| 2016/0364679 A1 * | 12/2016 | Cao | G06Q 50/30 |
| 2016/0364812 A1 * | 12/2016 | Cao | G06Q 50/30 |
| 2016/0364823 A1 * | 12/2016 | Cao | G06Q 50/30 |
| 2018/0156623 A1 * | 6/2018 | West | G01C 21/3423 |
| 2018/0189717 A1 * | 7/2018 | Cao | G06Q 10/083 |
| 2020/0151291 A1 * | 5/2020 | Bhattacharyya | G06F 30/20 |
| 2020/0401743 A1 * | 12/2020 | Bhattacharyya | G06F 30/20 |

FOREIGN PATENT DOCUMENTS

| | | | |
|---|---|---|---|
| EP | 1873491 A1 | 1/2008 | |
| EP | 2767963 A1 | 8/2014 | |
| WO | WO2017100719 A1 * | 12/2015 | |

OTHER PUBLICATIONS

Search Report for International Patent Application No. PCT/EP2017/060726; dated Aug. 2, 2017.

* cited by examiner

METHOD FOR COORDINATING A MEETING POINT OF A SELF-DRIVING TRANSPORTATION VEHICLE AND OF A USER

PRIORITY CLAIM

This patent application is a U.S. National Phase of International Patent Application No. PCT/EP2017/060726, filed 4 May 2017, which claims priority to German Patent Application No. 10 2016 210 494.2, filed 14 Jun. 2016, the disclosures of which are incorporated herein by reference in their entireties.

SUMMARY

Illustrative embodiments relate to a method for coordinating a meeting point of a self-driving transportation vehicle and of a user, and to an associated computer program and computer program product.

BRIEF DESCRIPTION OF THE DRAWINGS

The disclosed embodiments are explained in more detail below with reference to the figures, in which.

DETAILED DESCRIPTION

Figure 1:
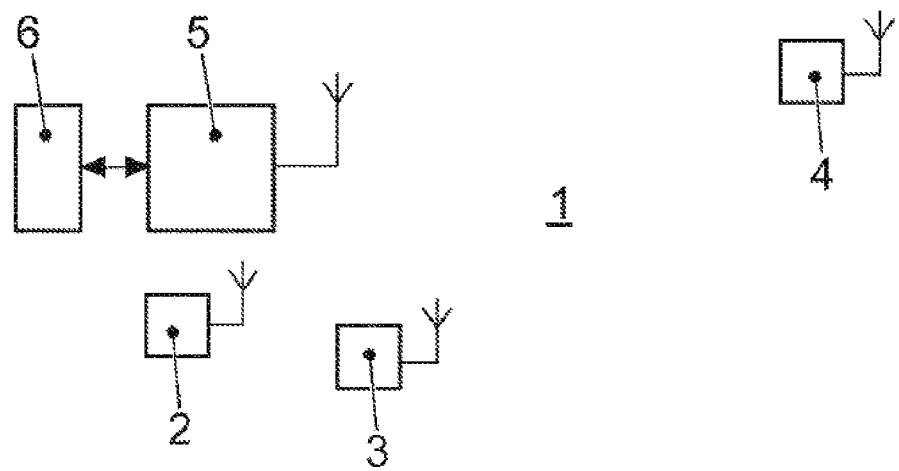
FIG. 1 is a schematic block diagram of a device for coordinating a meeting point of a self-driving transportation vehicle and of a user.

Transportation vehicles that drive automatically will play an essential role in road traffic in the future. Opportunities for deployment in transportation and the transport of goods are being considered. In addition to safety, reliability is crucial to the acceptance of such self-driving transportation vehicles as a method of transport.

DE 10 2010 003 610 A1 discloses a method, a system and alignment method or mechanism for automated alignment of dynamic travel routes with location-related ride requests.

EP 1 873 491 A1 discloses a method that is used to navigate two transportation vehicles to a suitable meeting point on the basis of their current position and the current traffic situation.

DE 10 2009 052 039 A1 discloses a similar method for people having a mobile terminal.

The disclosure addresses the technical problem of creating a method for coordinating a meeting point of a self-driving transportation vehicle and of a user, in which method the coordination process is optimized. Another technical problem is to create an associated computer program and computer program product.

Disclosed embodiments provide a method, a computer program, and a computer program product.

The method for coordinating a meeting point of a self-driving transportation vehicle and of a user comprises the following method operations:

a) the user entering a required meeting point by a communications-enabled terminal;

b) transmitting the required meeting point to a control center or to a self-driving transportation vehicle;

c) the control center or the self-driving transportation vehicle receiving the required meeting point;

d) checking current data on the surrounding area of the meeting point and/or a route from the current location of the self-driving transportation vehicle to the required meeting point, wherein the data on the surrounding area comprises traffic data and/or event data;

e) assessing the required meeting point on the basis of the data on the surrounding area, wherein according to the assessment, the required meeting point is confirmed, or at least one alternative meeting point is proposed, wherein the at least one alternative meeting point is transmitted to the terminal of the user;

f) the user confirming at least one alternative meeting point;

g) the control center or the self-driving transportation vehicle receiving the confirmation; and h) the self-driving transportation vehicle performing an automated journey according to the method operation e) or f) to the confirmed alternative meeting point.

Coordinating the meeting point can thereby be optimized, if, based on the data on the surrounding area, the required meeting point would lead to problems, for instance, relating to the arrival time or even to the association between transportation vehicle and user. The self-driving transportation vehicle may be a taxi or a parcel transportation vehicle, for example.

By virtue of the data on the surrounding area comprising traffic data and/or event data, it is possible, for example, for the assessment of the required meeting point to take into account that a theater show is coming to an end just at the required time. It is hence likely that a lot of people are at the required meeting point and also that the level of traffic activity is increasing. Furthermore, many other taxis are likely. This makes it more complicated for the user to find the taxi, and therefore an alternative meeting point appears sensible. Data on the surrounding area such as parking lots or parking garages can also be taken into account in addition to event information, because in combination with the event information, a large number of transportation vehicles drive away from the parking lot or out of the parking garage at the end of an event.

In at least one disclosed embodiment, the user can transmit proposals for alternative meeting points to the control center or the self-driving transportation vehicle. In this case, it can be provided that this alternative meeting point is always accepted or confirmed by the control center or the transportation vehicle. Alternatively, an assessment can be performed for this alternative meeting point, as for the required meeting point, and then the method repeated in full correspondingly. The benefit is that, in this case, any knowledge of the location that the user may have can be incorporated in the coordination process.

In a further disclosed embodiment, at least one parameter of the user is taken into account in selecting the at least one alternative meeting point. Examples of a parameter are age or the number of items of luggage, for instance.

In a further disclosed embodiment, the arrival times of transportation vehicle and user are taken into account in selecting the alternative meeting point(s). The coordination process can thereby be optimized such that the user does not have to wait long, for example. In this process, each of the expected arrival times can be displayed, so that the user can respond accordingly. It can also be provided that alternative meeting points are displayed, which are optimized for the transportation vehicle, with a financial compensation being offered to the user as compensation, for instance, because the user must walk or wait slightly longer.

In a further disclosed embodiment, the data on the surrounding area comprises traffic data and/or event data. Hence, for instance, the assessment of the required meeting point can take into account that a theater show is coming to an end just at the time required. It is hence likely that a lot of people are at the required meeting point and also that the level of traffic activity is increasing. Furthermore, many other taxis are likely. This makes it more complicated for the user to find the taxi, and therefore an alternative meeting point appears sensible. Data on the surrounding area such as parking lots or parking garages can also be taken into account in addition to event information, because in combination with the event information, a large number of transportation vehicles drive away from the parking lot or out of the parking garage at the end of an event.

In a further disclosed embodiment, the data on the surrounding area comprises bookings of other self-driving transportation vehicles. This data can be used, for example, to identify whether other orders exist for the required meeting point, which might make the association more difficult. Bookings of other, non-automated taxis can also be included in this case.

In a further disclosed embodiment, an association of a self-driving transportation vehicle to a user is altered dynamically. It can hence be provided, for instance, that during navigation to the meeting point, the one self-driving transportation vehicle is replaced by another transportation vehicle that is closer to the meeting point, for example. This allows flexible control of the transportation vehicle fleet and optimization of the traffic flow.

FIG. 1 shows a device 1 for coordinating a meeting point of a self-driving transportation vehicle 2, 3 and of a user 4. It shall be assumed here that the transportation vehicles 2, 3 are self-driving taxis. The device 1 also comprises a control center 5, which is connected to a database 6 for data on the surrounding area. The user 4 transfers a required meeting point and time to the control center 5 via a terminal. This communication may be wireless (for instance, by a smartphone) or may be wired communication (for instance, by a PC via an Internet connection).

Taking into account the locations of the transportation vehicles 2, 3 and the latest data on the surrounding area, for instance, information such as traffic situation, event information, additional bookings of transportation vehicles, the control center 5 then checks whether the required meeting point is easy to reach and/or how easy it is likely to be to associate the transportation vehicle with the user at the required meeting point. If the required meeting point satisfies an assessment criterion, the control center 5 confirms the job and communicates with a suitable transportation vehicle 2, 3, wherein the control center 5 then transfers the relevant details (meeting point, route, user, time, etc.) to the transportation vehicle 2, 3. The transportation vehicle 2, 3 then travels by self driving to the required meeting point to pick up the user. During the journey, the transportation vehicle 2, 3 can inform the user continuously about its location and scheduled arrival time.

On the other hand, if the required meeting point does not satisfy the assessment criterion, the control center 5 determines at least one alternative meeting point, taking into account at least one parameter of the user 4, for instance, a parameter such as number of items of luggage, age, impaired mobility. The parameters can already have been transferred with the original request or else can have been retrieved in a dialog. The user can then decide whether he wishes to adhere to the required meeting point, confirm the alternative meeting point, or propose a personal alternative meeting point which is then reassessed by the control center 5. Then a suitable transportation vehicle 2, 3 is sent to the meeting point or alternative meeting point.

Figure 2:
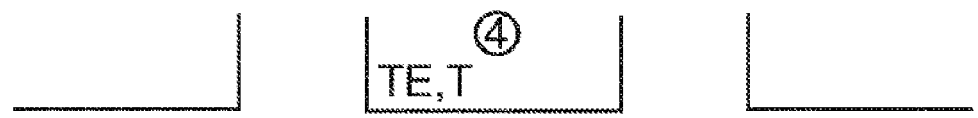
FIG. 2 is a schematic diagram of a required meeting point and an alternative meeting point.
Figure 2:
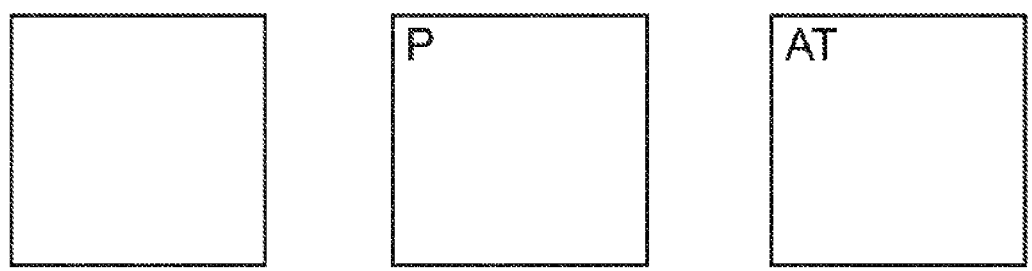
Figure 2:

FIG. 2 is used to explain briefly one possible scenario.

1. Booking: the user employs in the usual manner a smart device for the booking process on a digital street map (e.g., main street theater entrance TE as the required meeting point T)

2. Problem: the number of visitors to the theater is high. The control center registers a large number of taxi bookings. In addition, the volume of traffic after the end of the show rises steeply, because a parking garage P is located close to the main street entrance.

3. Information exchange: the user is informed and notified of the problems. He has the choice of (1) proposing a personal alternative meeting point, (2) selecting an alternative meeting point from a list from the control center 5, or (3) making no change.

4.1 Option (1): the user knows his way around. He knows that he can get to a side street in 5 minutes that is less busy with traffic and which may even be more convenient for getting home. Such an alternative meeting point AT is shown in FIG. 2.

4.2 Option (2): the user selects from a list; the alternatives have been ranked according to distance, volume of traffic and amount of luggage and number of people. Since the user has booked a taxi for 2 people without luggage, there is nothing to prevent a 3-minute walk to the other side of the theater.

5. If applicable, the transportation vehicle alters its route to the alternative meeting point.

6. By predicting the speeds, transportation vehicle and user arrive approximately at the same time.

Figure 3:
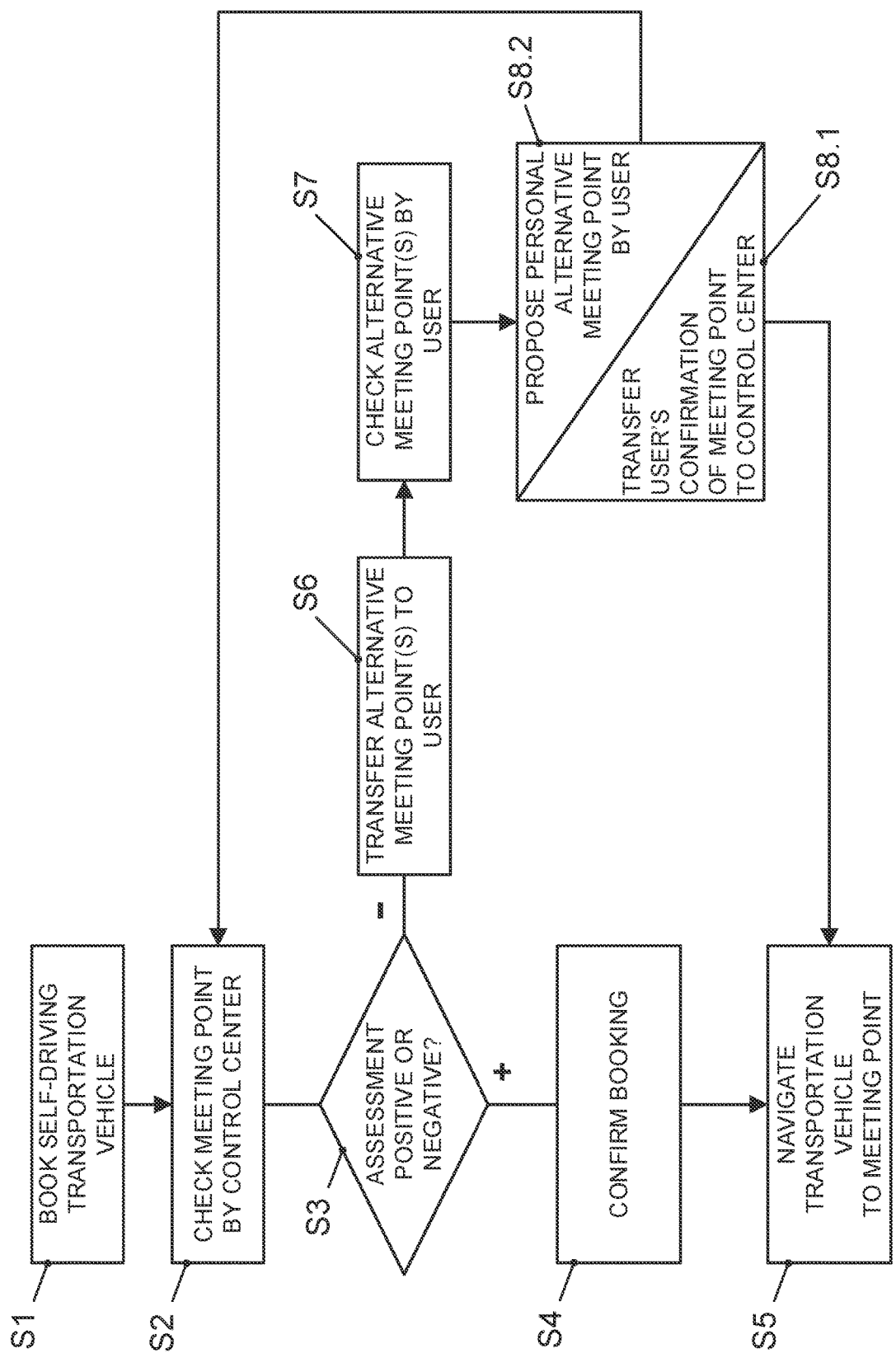
FIG. 3 is a simplified flow diagram of a method for coordinating a meeting point of a self-driving transportation vehicle and of a user.

FIG. 3 shows a flow diagram. In an operation at 51, a self-driving transportation vehicle 2, 3 is booked by meeting point, time, number of people and items of luggage. In an operation at S2, the control center checks the required meeting point. If the assessment S3 is positive, the booking is confirmed in an operation at S4, and the transportation vehicle 2, 3 is navigated to the meeting point in operation at S5. On the other hand, if the assessment is negative, alternative meeting points are transferred in operation at S6, and checked by the user in operation at S7. If the user confirms the original meeting point or an alternative meeting point according to S6, then this is transferred to the control center in an operation at S8.1, and the method continues with operation at S5. If, however, the user enters a personal alternative meeting point in an operation at S8.2, then this is reassessed (S2).

The invention claimed is:

1. A method for coordinating a meeting between a self-driving transportation vehicle and a user, the method comprising:

receiving a requested meeting point entered by the user by a communications-enabled terminal;

transmitting the requested meeting point to a control center or to the self-driving transportation vehicle;

receiving the requested meeting point by the control center or the self-driving transportation vehicle;

checking current data on the surrounding area of the requested meeting point and/or a route from the current location of the self-driving transportation vehicle to the requested meeting point, wherein the data on the surrounding area comprises traffic data;

assessing the requested meeting point based on the data on the surrounding area to determine whether to propose at least one alternative meeting point to the user, wherein the requested meeting point is confirmed or the at least one alternative meeting point is proposed according to the assessment in a transmission to the terminal of the user;

receiving confirmation of the requested meeting point or the at least one alternative meeting point from the user by the control center or the self-driving transportation vehicle; and performing an automated journey by the self-driving transportation vehicle to the requested meeting point or the at least one alternative meeting point according to the confirmation received from the user, wherein the data on the surrounding area further comprises event data, wherein the event data comprises start and/or end times of at least one of a social event, a theatrical event, a musical event, a sporting event, and a cinematic event.

2. The method of claim 1, wherein the control center or the self-driving transportation vehicle receive proposals for alternative meeting points from the user.

3. The method of claim 2, wherein at least one user parameter is taken into account in selecting the at least one alternative meeting point.

4. The method of claim 1, wherein the self-driving transportation vehicle and user arrival times are taken into account in selecting the alternative meeting point.

5. The method of claim 1, wherein the data on the surrounding area comprises bookings of other self-driving transportation vehicles.

6. The method of claim 1, wherein an association of the self-driving transportation vehicle to the user is altered dynamically.

7. A computer program comprising program code stored on a computer-readable medium, wherein the code performs a method for coordinating a meeting between a self-driving transportation vehicle and a user when the program is executed on a computer, the method comprising:

receiving a requested meeting point entered by the user by a communications-enabled terminal;

transmitting the requested meeting point to a control center or to the self-driving transportation vehicle;

receiving the requested meeting point by the control center or the self-driving transportation vehicle;

checking current data on the surrounding area of the requested meeting point and/or a route from the current location of the self-driving transportation vehicle to the requested meeting point, wherein the data on the surrounding area comprises traffic data;

assessing the requested meeting point based on the data on the surrounding area to determine whether to propose at least one alternative meeting point to the user, wherein the requested meeting point is confirmed or the at least one alternative meeting point is proposed according to the assessment in a transmission to the terminal of the user;

receiving confirmation of the requested meeting point or the at least one alternative meeting point from the user by the control center or the self-driving transportation vehicle; and performing an automated journey by the self-driving transportation vehicle to the requested meeting point or the at least one alternative meeting point according to the confirmation received from the user, wherein the data on the surrounding area further comprises event data, wherein the event data comprises start and/or end times of at least one of a social event, a theatrical event, a musical event, a sporting event, and a cinematic event.

8. The computer program of claim 7, wherein the control center or the self-driving transportation vehicle receive proposals for alternative meeting points from the user.

9. The computer program of claim 7, wherein at least one user parameter is taken into account in selecting the at least one alternative meeting point.

10. The computer program of claim 7, wherein arrival times of the self-driving transportation vehicle and the user are taken into account in selecting the alternative meeting point.

11. The computer program of claim 7, wherein the data on the surrounding area comprises bookings of other self-driving transportation vehicles.

12. The computer program of claim 7, wherein an association of the self-driving transportation vehicle to the user is altered dynamically.

* * * * *